Oct. 11, 1960 W. R. CLINGENPEEL 2,955,607
AIRCRAFT BATTERY VENT PLUG
Filed May 14, 1958

INVENTOR.
WILLIAM R. CLINGENPEEL
BY
Falvey, Souther & Stottenberg
ATTORNEYS

United States Patent Office 2,955,607
Patented Oct. 11, 1960

2,955,607

AIRCRAFT BATTERY VENT PLUG

William R. Clingenpeel, 575 Williamsdale Drive, Toledo, Ohio

Filed May 14, 1958, Ser. No. 735,318

2 Claims. (Cl. 137—43)

This invention relates to vent plugs for storage batteries, more particularly to vent plugs for use in storage batteries for aircraft where severe vibration is encountered such as in combat craft.

In the operation of aircraft having storage batteries installed therein for operation of their electrical systems, it is essential to provide the storage batteries with vent plugs having valves which close at a predetermined angle of tilt to prevent leakage of the electrolyte and which will open again upon return to the normal position of operation even though a relatively high gas presure, such as 50 centimeters of mercury, has accumulated in the battery cell during the period in which the vent plug valve was closed. Furthermore, the chemical conditions under which these vent plugs must operate are very deteriorating to the materials from which they are manufactured, and also the mechanical conditions such as severe vibration cause difficulties by wear and abrasion between the contacting surfaces of the parts, so that exceptional inertness to chemical action and durability with reference to mechanical wear are absolutely necessary.

It is, therefore, a principal object of this invention to provide a vent plug for use with aircraft batteries, which will operate for long periods of time under exacting pressure conditions including back pressure and which will operate for long periods of time at an exact angle of tilt to open and close a venting valve even though subjected to severe vibration.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figures 1, 3:
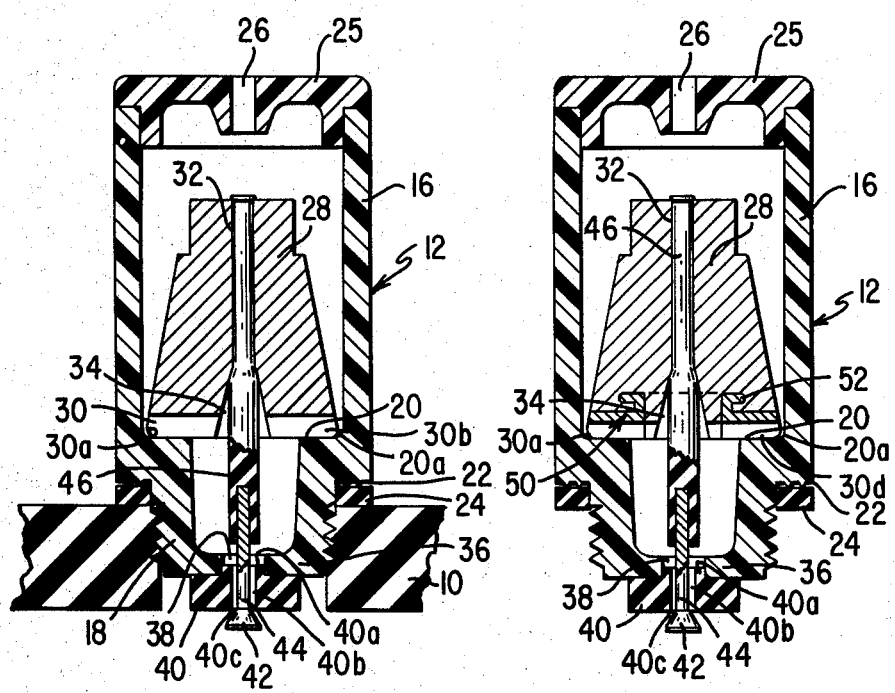
Fig. 1 is a sectional elevation of a vent plug incorporating the invention.
Fig. 3 is a view similar to Fig. 1 of another modification of the invention.

Referring to the drawings, particularly to Fig. 1, a battery container 10, which contains a free electrolyte such as utilized in a lead-acid battery, is fitted with a vent 12 which is screw-threaded in sealed relation into an aperture 14 in the upper surface of the container or housing 10. The vent structure comprises generally a pair of tubular portions in aligned relation, consisting of an upper portion 16 and a lower portion 18, which are integrally joined in the region of an internal shoulder 20. The upper portion is substantially larger than the lower portion whose exterior is provided with the screw threads to fit into the aperture 14 in the battery housing. An outer shoulder 22 is formed adjacent and below the inner shoulder 20 on the vent structure which cooperates with a gasket 24 which form a seal when the vent is tightly screwed into the aperture 14 with the upper surface of the container.

The vent body is molded from an acid-resistant grade of phenolic molding powder such as Durez 77SB, which can withstand the corrosive action of 1.300 specific gravity sulfuric acid for 10 days at 200° F. without deterioration. It will also withstand an air temperature of 260° F. The same material is used in a vent cap 25 which is fitted to the upper end of the upper portion of the vent structure 16 and cemented in position. A central aperture 26 is provided in the cap 25 to allow escape of gases from the interior of the vent structure.

Figure 2:
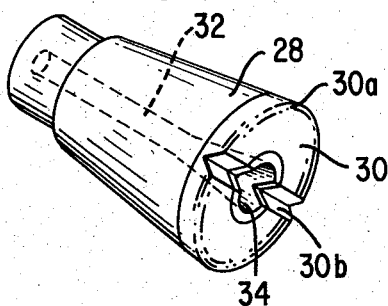
Fig. 2 is an isometric view of the actuating weight for the valve member.

Positioned on the interior of the upper portion 16 of the vent body where a relatively large cavity is formed, and seated on the internal shoulder, a tiltable weight 28 is provided, which is in the form of a truncated cone having its enlarged base portion 30 resting on the shoulder 20. Where the base portion joins the conical portion of the weight, a surface of revolution 30a is provided which is given a transverse radius of curvature of approximately .031 inch on which the weight is adapted to tilt when the battery to which the vent structure is attached is tilted, the action of gravity on the weight will cause it to move about this surface. An angle of tilt between 42–48 degrees is one which should cause the weight to move, and the center of gravity and the dimensions of the weight are proportioned to give this result. The weight is molded from an alloy which consists preferably of 17% antimony, 7% tin and the remainder lead which will give the finished weight a hardness of about Rockwell R 94–97. The weight is provided with a central bore 32 on the longitudinal axis, symmetrical with the axis of the truncated cone conformation, and at its lower end this bore is enlarged with a conical section 34 for reasons to be described hereinafter. The base 30 of the weight is also provided with a diametrical slot 30b (Fig. 2) which allows gases to escape past the weight when it is seated on the shoulder 20 into the upper cavity from whence it may escape to the atmosphere through the vent aperture 26 in the cover 25.

The surface of revolution 30a on the weight 28 cooperates with a fillet 20a located at the perimeter of the internal shoulder 20 where it is integrally joined to the upper portions 16 of the main body. The radius of curvature of the fillet is approximately the same as that of the surface 30a, being also in the form of a surface of revolution, so that a broad surface is presented to the weight 30 about which it may tilt as already described. Under severe vibration, these broad coacting surfaces 20a and 30a on the housing and the weight, substantially prevent peening or flowing of the lead in the weight under the impact arising from the vibration.

The lower tubular portion 18 is provided with a floor 36 which is pierced by a central aperture 38 to communicate with the interior of the battery housing 10. The lower surface of the floor is flat and has, cemented thereto, a valve seat 40 of acid resistant rubber compounds, such as Butyl rubber and other copolymers, having a durometer "A" hardness of 50, being provided with a centering flange 40a to fit inside of the aperture 38 of the floor. The central hole 40b of the valve seat 40 is critical as to size and also the curvature and smoothness of its lower edge 40c must be carefully controlled, so that its cooperation with a headed valve member 42 will provide a seal when brought together by a mechanism to be further described hereinafter.

The valve member 42 has a conical head which is larger than the opening of the central hole 40b of the valve seat, through which the stem 44 of the valve member extends. The diameter of the stem 44 is proportioned to the diameter of the hole 40b of the valve seat, so that sufficient clearance area is provided between them to allow the flow of 200 cc. of gas per minute at 1 cm. of mercury pressure, which is required to vent the gases from the battery case under normal conditions.

The upper end of the stem 44 is tightly fitted and cemented into a central longitudinal aperture in the lower end of a cylindrical acid-resistant rubber connecting member 46, preferably molded from Butyl rubber compound having approximately 60 "A" durometer hardness. The connecting member 46 is sufficiently long to extend through the central aperture 32 of the lead plummet, as shown, and has a diametral dimension slightly larger than the aperture 32, so that when it is drawn into position in the aperture, it will be compressed to provide sufficient friction therewith to firmly hold it in position. The position of the cooperating parts is adjusted during assembly, so that when the plummet is resting on the internal shoulder 20 of the body, the conical head of the valve member 42 will just clear the lower surface of the seat 40 substantially as shown in the drawings. Then when the plummet tilts under the action of gravity, the conical head of the valve member 42 will be drawn into sealing relation with the seat 40 to prevent escape of the free electrolyte from the battery container.

When the plummet again assumes its normal operating position shown in the drawings, under the action of gravity, the connecting member must be sufficiently stiff to again push the head of the valve free from its seat, even though a pressure has been built up within the battery container which may attain a unit pressure equal to that created by 50 cc. of mercury.

The valve member 42 is preferably molded from an acid-resistant plastic such as Teflon (polytetrafluoroethylene), Kel-F (polychlorotrifluoroethylene) or Penton (poly 3,3-bichloromethylcyclopentene). It may also be made of metal which is highly resistant to the corrosive action of the electrolyte such as Hastelloy B which has the following constituents:

| | |
|---|---|
| Chromium | 1.0% max. |
| Carbon | .12% max. |
| Molybdenum | 26–30%. |
| Silicon | 1.0% max. |
| Manganese | 1.0% max. |
| Iron | 4–7%. |
| Nickel | Balance. |

Rem-Cru Titanium 30 Mo may also be used, which has the following constituents:

| | |
|---|---|
| Molybdenum | percent 30 |
| Titanium | Balance |

Tantalum may also be used. The cements used to affix the valve stem 44 to the connecting member 46, must have sufficient adhesion to both elements to pass shock and vibration stresses and must be acid-resistant such as rubber cement or epoxy resin cements. The same is true for the cement used to attach the valve seat 40 to the floor 36.

Figure 4:
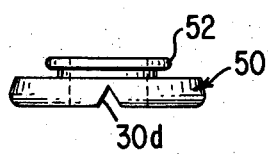
Fig. 4 is an elevational view of a portion of the weight incorporated in the vent plug shown in Fig. 3.

To still further enhance the resistance of the plummet 28 to vibration, a metal shoe 50 may be provided made of the acid-resistant metals set forth which is cast into interlocking relation with the lead body as shown in Figs. 3 and 4. An annular collar 52 is provided on the upper surface of the shoe to provide the interlock with the adjacent portions of the lead body of the plummet. The perimetrical edge of the shoe is polished and smoothly rounded to the same radius of curvature as the adjacent body portion. The shoe is provided with the vent slots 30d as before. Otherwise, the action of the vent is the same as that described with reference to Fig. 1.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a vent structure for a storage battery, a rigid acid-resistant body of plastic material having a portion adapted to be attached to the storage battery, said body consisting of two generally tubular portions in aligned relation provided with an internal annular shoulder intermediate the two tubular portions, a tiltable weight in the form of a truncated cone resting on the shoulder by its enlarged base, a floor for the lower tubular portion provided with a central opening, the surface of the weight and the surface of the adjacent floor and tubular portion which coact when the weight tilts being formed as surfaces of revolution, a valve seat of rubbery material having a small integral flange surrounding the upper end of a smooth central venting opening in the valve seat, said flange fitting into the central floor opening when said seat is cemented to the lower side of the floor, a valve member of acid-resistant material having a head on its lower end to form a seal on said valve seat and a stem to extend through said central opening of the floor and the seat, the dimensions of the venting opening in the valve seat and the stem being such as to allow the passage of 200 cubic centimeters of gas between them at a pressure of 1 centimeter of mercury when the valve is in open position, and a flexible connecting member attached to the tiltable weight and the stem of the valve member to open and close the sealing relation between the head of said valve member and said valve seat when the force of gravity causes the weight to tilt on said internal shoulder.

2. In a vent structure for a storage battery, a rigid acid-resistant body of plastic material having a portion adapted to be attached to the storage battery, said body consisting of two generally tubular portions in aligned relation provided with an internal annular shoulder intermediate the two tubular portions, a tiltable weight in the form of a truncated cone resting on the shoulder by its enlarged base, a floor for the lower tubular portion provided with a central opening, the surface of the weight and the surface of the adjacent floor and tubular portion which coact when the weight tilts being formed as surfaces of revolution, a valve seat of rubbery material having a small integral flange surrounding the upper end of a smooth central venting opening in the valve seat, said flange fitting into the central floor opening when said seat is cemented to the lower side of the floor, a valve member of acid-resistant material having a head on its lower end to form a seal on said valve seat and a stem to extend through said central opening of the floor and the seat, the dimensions of the venting opening in the valve seat and the stem being such as to allow the passage of 200 cubic centimeters of gas between them at a pressure of 1 centimeter of mercury when the valve is in open position, and a flexible connecting member attached to the tiltable weight and the stem of the valve member to open the valve against a gas pressure of 50 centimeters of mercury and to close the valve in sealing relation with said valve seat when the force of gravity causes the weight to tilt on said internal shoulder.

References Cited in the file of this patent
UNITED STATES PATENTS

| 2,306,974 | Oestermeyer | Dec. 29, 1942 |
| 2,619,102 | Endress | Nov. 25, 1952 |
| 2,769,452 | Gill | Nov. 6, 1956 |
| 2,853,089 | Bair | Sept. 23, 1958 |